US007706383B2

(12) United States Patent
Nagarajan et al.

(10) Patent No.: US 7,706,383 B2
(45) Date of Patent: Apr. 27, 2010

(54) MINIMUM CONTENTION DISTRIBUTED WAVELENGTH ASSIGNMENT IN OPTICAL TRANSPORT NETWORKS

(75) Inventors: Ramesh Nagarajan, Somerset, NJ (US); Muhammad A Qureshi, Metuchen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1724 days.

(21) Appl. No.: 09/919,045

(22) Filed: Jul. 31, 2001

(65) Prior Publication Data

US 2003/0026297 A1 Feb. 6, 2003

(51) Int. Cl.
*H04L 12/56* (2006.01)
(52) U.S. Cl. .................................. 370/395.31; 709/229
(58) Field of Classification Search ................. 370/419, 370/420, 386, 351, 389, 242, 248, 238, 237, 370/238.1, 395.3, 395.31, 395.32, 254, 228, 370/231, 400, 395.2, 395.41, 395.21, 395.4, 370/401–402; 398/50; 709/229, 226
See application file for complete search history.

(56) References Cited

U.S. PATENT DOCUMENTS

| | | | | |
|---|---|---|---|---|
| 5,319,485 A | * | 6/1994 | Yasui et al. .................... 398/79 |
| 5,365,344 A | * | 11/1994 | Eda et al. ....................... 398/79 |
| 5,465,379 A | * | 11/1995 | Li et al. ......................... 712/11 |
| 5,649,108 A | * | 7/1997 | Spiegel et al. ................ 709/241 |
| 5,699,177 A | * | 12/1997 | Yamamoto ..................... 398/58 |
| 5,719,868 A | * | 2/1998 | Young ........................... 370/436 |
| 5,739,935 A | * | 4/1998 | Sabella ........................... 398/50 |
| 5,774,244 A | * | 6/1998 | Tandon et al. ................. 398/67 |
| 6,130,875 A | * | 10/2000 | Doshi et al. ................... 370/225 |
| 6,215,763 B1 | * | 4/2001 | Doshi et al. ................... 370/216 |
| 6,256,295 B1 | * | 7/2001 | Callon .......................... 370/254 |
| 6,278,536 B1 | * | 8/2001 | Kai et al. ........................ 398/79 |
| 6,289,096 B1 | * | 9/2001 | Suzuki .................... 379/221.01 |
| 6,470,112 B2 | * | 10/2002 | Okayama ...................... 385/24 |
| 6,493,350 B2 | * | 12/2002 | Hojo et al. ................... 370/420 |
| 6,584,100 B1 | * | 6/2003 | Ngo ............................. 370/377 |
| 6,707,823 B1 | * | 3/2004 | Miyao ......................... 370/406 |
| 6,744,775 B1 | * | 6/2004 | Beshai et al. ............... 370/409 |
| 6,882,799 B1 | * | 4/2005 | Beshai et al. .................. 398/45 |
| 2002/0118636 A1 | * | 8/2002 | Phelps et al. ................. 370/222 |
| 2002/0191247 A1 | * | 12/2002 | Lu et al. ...................... 359/124 |

FOREIGN PATENT DOCUMENTS

WO   WO 98 47039   10/1998

OTHER PUBLICATIONS

Yuan et al, "Distributed Control in Optical WDM Networks", *Military Communications Conf., 1996, MILCOM '96, Conference Proceedings, IEEE, McLean, VA, USA* 21-24 Oct. 1996, New York, NY USA, pp. 100-104.
B. Mukherjee, "Optical Communication Networks", 1997, McGraw-Hill, New York, US, pp. 380-385.
R. Ramaswami et al, "Optimal Routing and Wavelength Assignment In All-Optical Networks", *Proceedings of the Conference on Computer Communications (INFOCOM), Toronto, Jun. 12-16, 1994, Los Alamitos, IEEE Comp. Soc. Press, US.*, vol. 2, pp. 970-979.

* cited by examiner

*Primary Examiner*—Brenda Pham
(74) *Attorney, Agent, or Firm*—John E. Curtin

(57) ABSTRACT

An optical transport network comprises a number of nodes, or routers, which are coupled together via optical fibers. When a physical link comes up between a node and a neighboring node, a handshake between the node and the neighboring node recognizes the link such that the node, and the neighboring node, include it in respective link assignment tables. In addition, the node and the neighboring node negotiate a predefined sequence for assigning link resources from their respective assignment tables for satisfying future connection requests.

10 Claims, 7 Drawing Sheets

Table B-one,
First Level Ordering Table,
OXC B

| Level 1 ids | Ports |
|---|---|
| 1 | B1 |
| 2 | B2 |
| 3 | B3 |
| 4 | B4 |
| 5 | B5 |
| 6 | B6 | top-down

Table E-one,
First Level Ordering Table,
OXC E

| Level 1 ids | Ports |
|---|---|
| 1 | E6 |
| 2 | E5 |
| 3 | E4 |
| 4 | E3 |
| 5 | E2 |
| 6 | E1 |

Bottom-up

FIG. 5

Table B-two,
Second Level Ordering Table,
OXC B

| Level 2 ids | Level 1 ids | Transmitters |
|---|---|---|
| 1 | 3 | T3 |
| 2 | 4 | T4 |
| 3 | 2 | T2 |
| 4 | 5 | T5 |
| 5 | 1 | T1 |
| 6 | 6 | T6 |

Table E-two,
Second Level Ordering Table,
OXC E

| Level 2 ids | Level 1 ids | Transmitters |
|---|---|---|
| 1 | 4 | T3 |
| 2 | 3 | T4 |
| 3 | 5 | T2 |
| 4 | 2 | T5 |
| 5 | 6 | T1 |
| 6 | 1 | T6 |

MINIMUM CONTENTION DISTRIBUTED WAVELENGTH ASSIGNMENT IN OPTICAL TRANSPORT NETWORKS

TECHNICAL FIELD

This invention relates generally to communications and, more particularly, to optical communications.

BACKGROUND OF THE INVENTION

A transport network typically comprises a number of nodes, connected by links, for transporting information (whether representing data or voice) over a connection path. The latter is setup between a source node and a destination node of the transport network and may also comprise a number of intermediate nodes. Typically, in order to establish this connection path, a "connection setup" takes place.

Generally, for scalability and reliability reasons, network management functions such as path computation and connection setup are implemented in a distributed fashion. In other words, when a node gets a connection request (hence becoming the source node) from itself to any other node (the destination node) in the network, the source node first computes the path through the network independent of any other request in the system at that time. (Of course this requires that each node periodically get updates of the network status in terms of available capacity and resources). As such, connection setup between a source node and a destination node involves signaling to setup a cross-connect at every one of the intermediate nodes in the connection path. These cross-connects are setup between link resources assigned to the connection. In an optical transport network (OTN), the cross-connects are referred to as optical cross-connects (OXCs), the links are dense wavelength division multiplexed (DWDM) links, and the link resources are wavelengths assigned to individual connections. (It should be noted that the particular link resources are assigned via local nodal decisions rather than by the source node, which simply computes the connection path.)

Unfortunately, one of the problems inherent to a distributed implementation of network management functions is that of resource contention. For example, it is possible that cross-connect requests for two or more connection setups reach a common link in their path at the same time. If the requests are being setup from opposite directions, i.e., from alternate ends of the link, then the node on each side of the common link may allocate the same wavelengths to the different connection requests. This type of resource conflict may end up tying up wavelength ports and either causing unnecessary crankbacks or worse—deadlocks. The result may be extremely slow connection setup times and slow network restoration speed (in the event of a failure in the network)—not to mention a possible loss of revenue for service providers.

SUMMARY OF THE INVENTION

We have observed that since link resources are shared by the nodes at the two ends of the link, some coordination is needed between neighboring nodes to avoid the wavelength assignment problem illustrated above. Therefore, and in accordance with the invention, in response to a connection request, a node of a packet-based network assigns link resources for connecting to a neighboring node using a predefined sequence that was negotiated with the neighboring node.

In an embodiment of the invention, an optical transport network comprises a number of nodes, or routers, which are coupled together via optical fibers. When a physical link comes up between a node and a neighboring node, a handshake between the node and the neighboring node recognizes the link such that the node, and the neighboring node, include it in respective link assignment tables. In addition, the node and the neighboring node negotiate a predefined sequence for assigning link resources from their respective assignment tables for satisfying future connection requests. For example, the node assigns link resources from the top-down, while the neighboring nodes assigns link resources from the bottom-up.

BRIEF DESCRIPTION OF THE DRAWINGS

FIGS. 4 and 5 show illustrative ordering tables in accordance with the principles of the invention.

DETAILED DESCRIPTION

Figure 1:
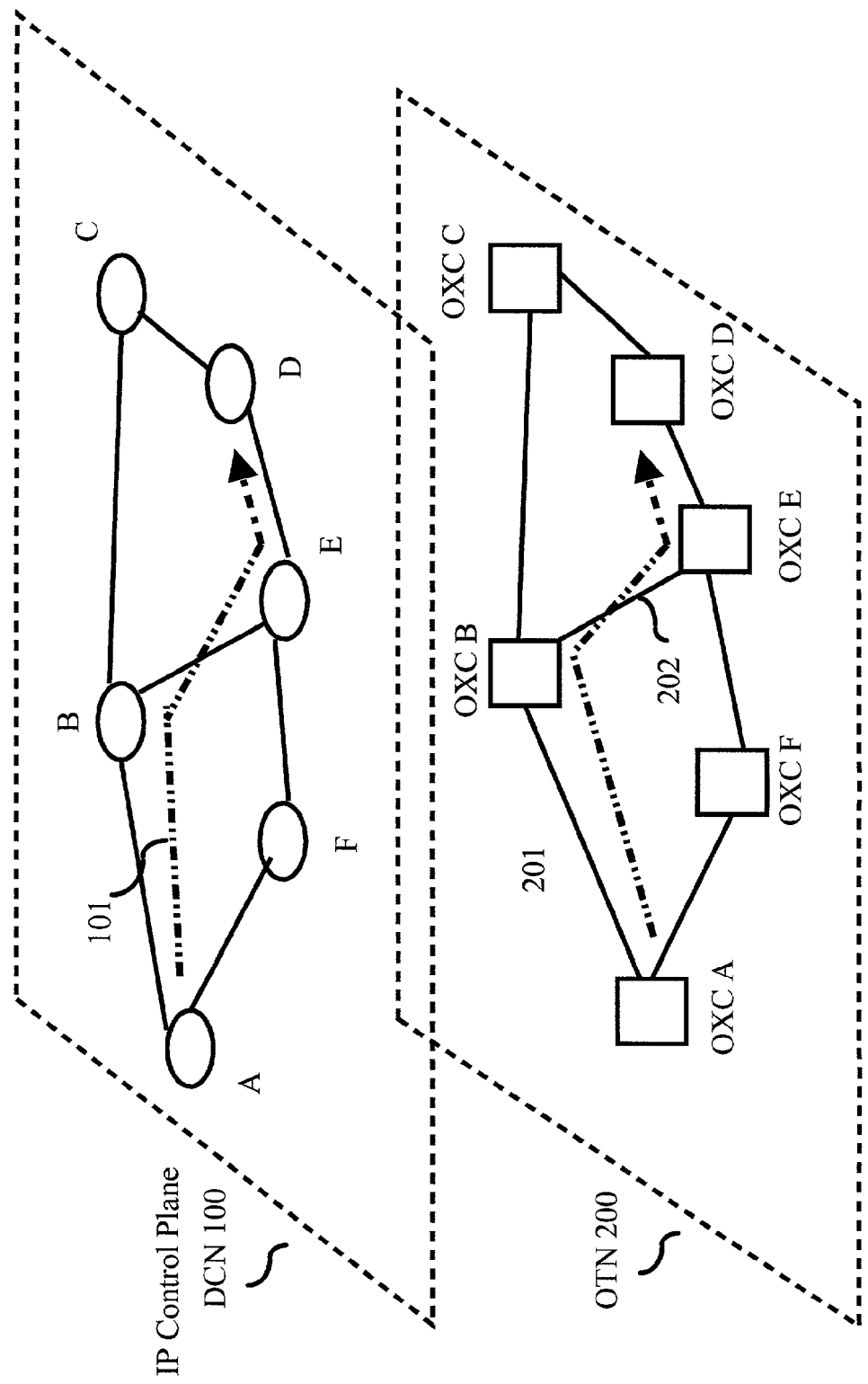
FIG. 1 shows an illustrative optical communications system embodying the principles of the invention.

An illustrative optical communications system, in accordance with the principles of the invention is shown in FIG. 1. Other than the inventive concept, the elements shown in FIG. 1 are well known and will not be described in detail. For example, optical transport network (OTN) 200 is an optical transport network comprising a number of optical cross-connect (OXC) nodes (also referred to as OTN nodes, or simply "nodes"), e.g., OXC A, OXC B, OXC C, OXC D, OXC E and OXC F, having an illustrative OTN topology as shown. Also, although shown as a single block element, each node (e.g., OXC A) includes stored-program-control processors, memory, switching elements and appropriate interface cards (not shown in FIG. 1). Except as noted below, it is assumed that OTN 200 conforms to a synchronous optical network (SONET). (It should be noted that other elements such as gateways to provide access to, e.g., OTN 200, and user endpoints, are left off to simplify the description.) In addition, the inventive concept uses conventional programming techniques, which as such, will not be described herein.

As noted above, OTN 200 comprises OXC A, OXC B, OXC C, OXC D, OXC E and OXC F. The use of a signaling network (referred to herein as a control plane) is important for next generation intelligent optical networks for providing services like real time point-and-click provisioning of optical channels, optical layer protection and restoration, optical layer network topology auto-discovery and optical layer bandwidth management. For a number of reasons, such as easier feature enhancement and wider access of features to customers, the Internet Protocol (IP) has been emerging as the technology of choice to implement a control plane for OTNs. It is assumed that OTN 200 utilizes an IP-based control plane (out-of-band signaling on a separate wavelength) as represented by data communications network (DCN) 100. (An IP-based control plane is, in essence, another packet transport network for signaling messages—hence its representation as a DCN.) As such, DCN 100 comprises nodes A, B, C, D, E and F. (In effect, this is a logical separation since each node— physically—performs both transport and signaling.) DCN 100 is a packet transport network for all the signaling messages necessary for connection signaling (e.g., setup and teardown), failure notification and OAMP (operations, administration, maintenance and provisioning) messaging in OTN 200. (Other than the inventive concept, path computation, connection setup, cross-connects, and signaling messages in support thereof, are known in the art and will not be described herein.) DCN 100 utilizes any of a number of transport technologies such as, but not limited to, optical, SONET or Ethernet. This makes the DCN portable and applicable to any automatic switched transport network. Note, that in FIG. 1 DCN 100 and OTN 200 are illustrated as sharing the same topology. However, whether the DCN topology is independent of, or the same as, the OTN topology is not relevant to the inventive concept. Illustratively, it is assumed that multiprotocol label switching (MPLS) is used for the DCN network for explicitly routing control information along paths. (However, other routing protocols could also be used, such as open shortest path first (OSPF)). Also, for any optical path computation purposes, it is assumed that OTN topology information is passed to each DCN node through a link state exchange protocol as known in the art (e.g., the Link Management Protocol (LMP)).

FIG. 1 illustrates a sample connection setup in DCN 100 along signaling path 101 (A-B-E-D). In addition, FIG. 1 shows the corresponding transport path, 201, in OTN 200. With respect to this sample connection setup it is assumed that OXC A is the source node, OXC D is the destination node, and the remaining nodes, OXC B and OXC E, are intermediate nodes. For the purpose of the description below, it is assumed that a connection setup is initiated from a source node, e.g., as represented in FIG. 1 by OXC A, which receives a connection request through an external interface such as the network management system (not shown) or from a client such as an IP router (not shown). It is assumed that the OXCs are connected through dense wavelength division multiplexed (DWDM) links. As used herein, "downstream" refers to the flow of communications in the direction of the destination node, while "upstream" refers to the flow of communications in the direction of the source node. As such, an "upstream node" is a node that is closer to the source node, than the current node; while a "downstream node" is a node that is closer to the destination node, than the current node. Upon receipt of a connection request (which also includes a connection setup request, as known in the art), each node initiates and completes a cross-connect with a neighboring node.

Figure 2:
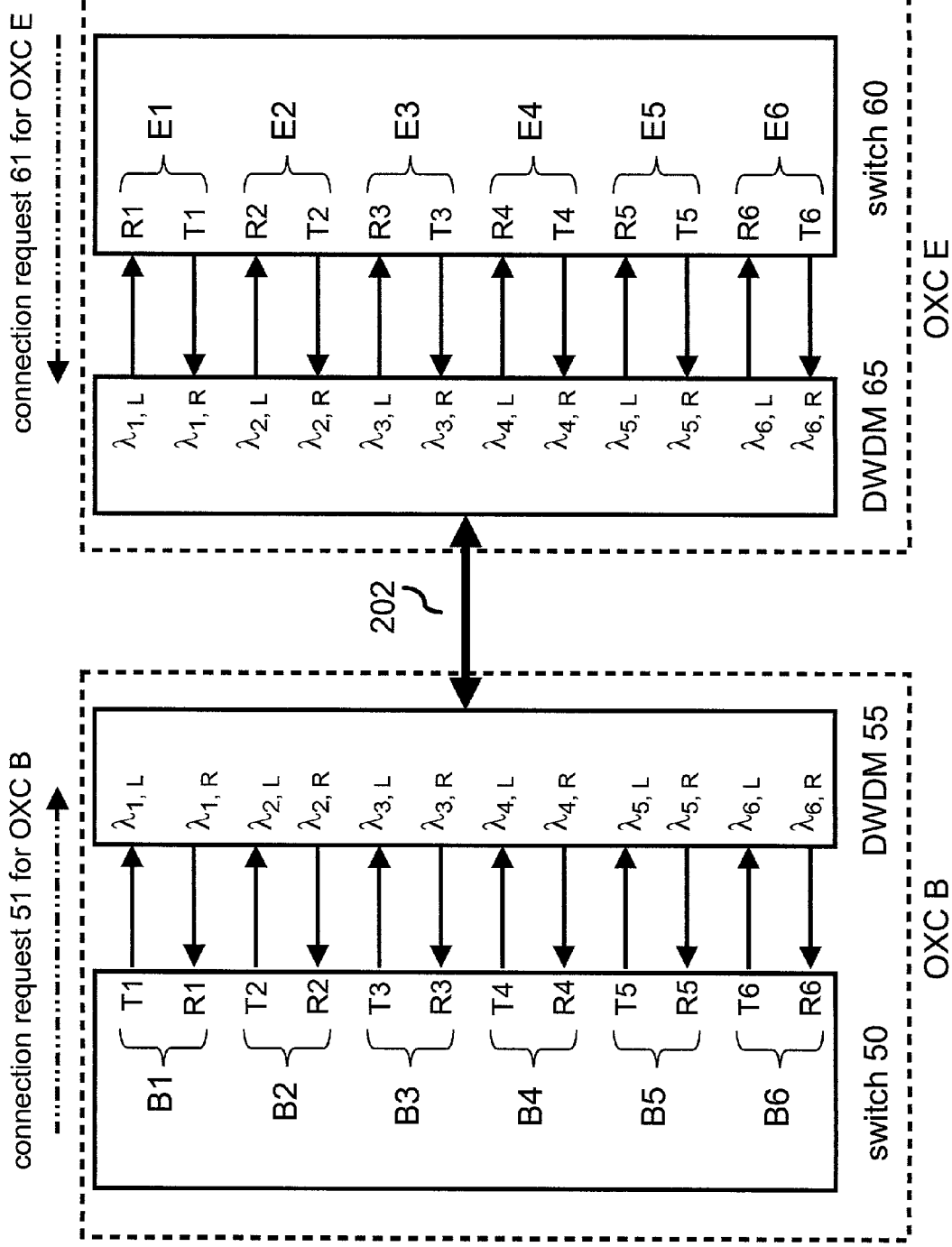
FIG. 2 shows OXC B, OXC E and link 202 of FIG. 1.

Turning now to FIG. 2, the inventive concept is illustrated—for either unidirectional or bi-directional connection requests—using OXC B, OXC E, and illustrative link 202 (a DWDM link with multiple wavelengths).

For a unidirectional request, it is assumed that OXC B and OXC E always receive and initiate any unidirectional connection request. In this context, OXC B is the upstream node of the unidirectional request traversing link 202 to OXC E, and OXC E is the upstream node of the unidirectional request traversing link 202 to OXC B.

Contrary to a unidirectional connection request, a bi-directional connection request traversing a link is initiated by either of the OXC nodes adjoining the link. Note that for bi-directional connections the OXC node that receives the request is the upstream OXC node for traffic in only one direction. For the traffic in other direction, it is the downstream OXC node. However, for sake of simplicity the OXC node that receives the bi-directional request is referred to as the upstream node of the bi-directional connection. Given this, it is assumed herein that the OXC node that is upstream in the computed path is always responsible for allocating wavelength(s) on the link. (Note that this is a natural assumption since the connection request arrives first at the upstream node.) With respect to the network shown in FIG. 1, this implies that OXC B is responsible for assigning wavelengths on link 202 for all the unidirectional and bi-directional connection requests that need to traverse link 202 and are initiated by either OXC A or itself. Similarly, OXC E is responsible for all the connection requests that need to traverse link 202 and are initiated by either OXC D or itself.

In light of the above, contention may arise when either both nodes adjoining a link try to simultaneously assign wavelengths to bi-directional connection requests or one node tries to assign wavelengths for a bi-directional connection request and the other node tries to assign a wavelength for a unidirectional connection request. (It should be noted that there is no contention when two nodes adjoining a link assign wavelengths on that link to unidirectional connection requests.)

For example, assume that OXC B and OXC E both receive different bi-directional connection requests for link 202 around the same time from different source nodes and directions. For example, OXC A could be a source node initiating a connection request 51 to OXC B, while OXC D is a source node initiating a connection request 61 to OXC E. In order to satisfy these requests, OXC B and OXC E both try to allocate ports and corresponding wavelengths on the link 202. As can be observed from FIG. 2, each OXC comprises a switching element (switch 50 for OXC B and switch 60 for OXC E) and a DWDM interface (DWDM 55 for OXC B and DWDM 65 for OXC E). The ports and wavelengths available for assignment to link 202 are illustratively represented, for OXC B, by ports B1 through B6 (and corresponding wavelengths) and, for OXC E, by ports E1 through E6 (and corresponding wavelengths). Physical ports on the OXC are assumed to consist of bi-directional wavelength pairs (transmit and receive) over one, or more, optical fibers. For example, for port B1, the transmit wavelength $\lambda_{1,L}$ and the receive wavelength is $\lambda_{1,R}$. (It is common operational practice to assign a bi-directional connection request on a port basis. Consequently, individual wavelengths from different ports are not used to satisfy a bi-directional connection requests.) Unfortunately, if OXC B selects port B1 and OXC E selects port E1, either connection request cannot complete since there is now a conflict over the allocation of ports and wavelengths for link 202 and a crankback results (i.e., the connection setup process must be terminated and started anew).

Therefore, and in accordance with the principles of the invention, it is desired to minimize, if not eliminate, the chance of a conflict in resource allocation. In particular, responsive to receipt of a connection request, a node of a packet-based network assigns link resources for connecting to a neighboring node using a predefined sequence that was negotiated with the neighboring node. In other words, each node coordinates with the neighboring router for assigning link resources to the connection request.

Figure 3:
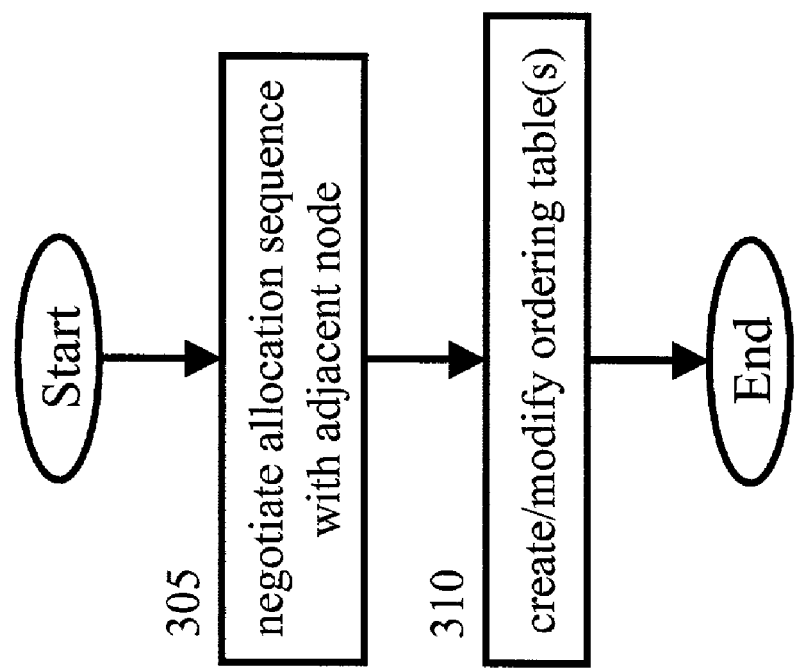
FIG. 3 shows an illustrative flow chart in accordance with the principles of the invention.

This is achieved by incorporating a coordination mechanism as part of known wavelength/link discovery processes. An illustrative method for use in each node for allocating resources over a common link between them is shown in FIG. 3. It is assumed that any of the existing link/topology discovery protocols (e.g., the Link Management Protocol (LMP)) are suitably modified to allow for the exchange of the requisite information shown in the figures and described below. Other than the inventive concept, such modifications are straightforward and not described herein. In step 305, a handshake occurs between adjacent (or neighboring) nodes for each link between them for negotiating a predefined sequence for allocating link resources. For example, one OXC node agrees to assign link resources from the top-down, while the other OXC node assigns link resources from the bottom-up. In addition, in step 310, one, or more, ordering tables (described below) are created, or, if already existing, are modified, by each OXC node. For example, when a physical link comes up, a handshake occurs between adjacent (or neighboring) nodes to recognize the link and include it for satisfying future connection requests in the ordering tables. Such protocol modifications are similar to the known "hello protocol" adopted in Internet Protocol (IP) networks.

Figure 4:
Figure 4:

In accordance with the invention, at least one ordering table—in conjunction with the predefined sequence—is used by an OXC to allocate resources over a link. For illustration purpose, it is assumed that link 202 provides six wavelengths in each direction for setting up paths as shown in FIG. 2. As a result, each adjacent OXC node has six transmitters and six receivers (e.g., port B1, of OXC B, has transmitter T1 and receiver R1, and port E1, of OXC E, has a transmitter T1 and receiver R1) associated with these wavelengths, which are paired into six ports (ports B1 through B6 for OXC B and ports E1 through E6 for OXC E). A first level of ordering is illustratively implemented by appropriately assigning, or mapping, numeric identifications (ids) to each port at the adjacent OXCs. This is done by creating a first level ordering table in each OXC node in accordance with the method of FIG. 3 A first level ordering table is illustrated in FIG. 4 for the two nodes, OXC B and OXC E, of FIGS. 1 and 2, connected through link 202. OXC B stores table B-one and OXC E stores table E-one. A first level of ordering is imposed by assigning unique numeric ids to corresponding ports in accordance with the predefined allocation sequence. For example, for table B-one, the numeric ids have illustrative values ranging from 1 to 6, where each numeric id associated with a particular one of the six ports on OXC B associated with link 202. Similarly, for table E-one, the numeric ids also have illustrative values ranging from 1 to 6, where each numeric id associated with a particular port on OXC E that is associated with link 202. The value of the numeric id on a particular first level ordering table represents the assignment order. For example, upon receipt of the first bi-directional connection request, OXC B assigns that port associated with the id value of 1—here, port B1—to the first bi-directional connection request. For OXC B, the next connection request is assigned that port associated with the id value of 2, and so on. On the other hand, it can be observed from FIG. 3 that OXC E assigns ports in the opposite direction. For example, upon receipt of the first bi-directional connection request, OXC E assigns that port associated with the id value of 1—here port E6—to the first bi-directional connection request, etc. Note, that this results in OXC B assigning wavelengths/ports from the top, e.g., starting at port B1, while OXC E assigns wavelengths/ports from the bottom, e.g., starting at port E6. Thus, contention is avoided till the last port, or pair of wavelengths, needs to be assigned. In other words, each OXC node adjoining a link starts at a different point in the first level ordering table and goes in a different direction. (It should be observed that although the predefined sequence was illustrated by the ordering of resources in each of the tables, other equivalent methods are possible. For example, the tables can simply list the available resources for the link (e.g., each table associates an id value of 1 with port 1, etc., down to an id value of 6 with port 6) and the processor is programmed to select resources from the table in accordance with the negotiated selection sequence (e.g., OXC B selects from the table starting at the id value of 1, while OXC E selects from the table starting at the id value of 6).)

Eventually, connections are released (e.g., torn down) and previously assigned wavelengths/ports are returned to the pool of available wavelengths. For example consider a scenario where OXC B has already responded to three connection requests and has assigned ports B1, B2 and B3; while OXC E has already responded to two connection requests and assigned ports E5 and E6. (It should be observed that a successful assignment by OXC B of port B1 to a connection request effectively assigns port E1 of OXC E to that same connection.) Given this scenario, there is only one available pair of wavelengths left on link 202 that can either be assigned by OXC B (port B4) or OXC E (port E4) to a bi-directional connection request. Obviously a contention can arise if both of these nodes try to assign these remaining wavelengths to bi-directional connection requests arriving at, or around, the same time. Now, suppose the pair of wavelengths corresponding to ports B1 and E1 that was previously assigned by OXC B gets released. In this situation, any contention can be simply avoided by OXC B next assigning the pair of wavelengths corresponding to port B1 instead of port B4. This is accommodated by requiring an OXC node to search its complete list of ports in its first level ordering table for each connection request starting at an id value of 1 (rather than start searching at the last assigned port in the port ordering). It should be noted that such a search can be efficiently implemented by simply adding another column to the first level ordering table, where each entry in the column indicates the availability status of the corresponding port.

In addition to the initial allocation of a link resource and its eventual release, another situation that needs to be addressed is the introduction of an additional port, or pair of wavelengths, on a link. For example, this can happen when the network operator upgrades the network capacity on that link. In this case, the first level ordering table is updated at the two adjoining OXC nodes in accordance with the flow chart shown in FIG. 3. Illustratively, one OXC node, e.g., OXC B of FIG. 2, adds the new port/wavelengths at the top of the first level ordering table, while the other OXC node, e.g., OXC E of FIG. 2, adds the new port/wavelengths at the bottom of the first level ordering table. For example, referring to FIG. 4, for OXC B an additional row is added to the first level ordering table having an id value of 7 and, then, the existing entries are shifted down such that port B1 is now associated with an id value of 2 and the new port is added to the first row of the first level ordering table. Similarly, for OXC E, an additional row is added to the first level ordering table having an id value of 7. However, in this case the new port is added to the last row of the first level ordering table, at an id value of 7. Thus to satisfy a bi-directional connection setup request the additional wavelength pair will become the first choice from one adjoining OXC (e.g., OXC B) whereas it will become the last choice (last element according to the assignment order) from the other adjoining node (e.g., OXC E).

The above-described link resource allocation mechanism is adequate for bi-directional connection requests, or unidirectional connection requests. However for certain combinations of unidirectional and bi-directional connection setup requests existing capacity may be under utilized. For example, referring back to FIG. 2, if each OXC node gets three unidirectional connection requests, then OCX B uses the transmitters on ports B1, B2 and B3, and OXC E uses the transmitters on ports E6, E5 and E4. (Of course, the corresponding receivers on ports E1, E2 and E3 for OXC E, and ports B6, B5 and B4 on OXC B get consumed). Now, a new bi-directional connection request concerning link 202 can not be accommodated because of the unavailability of any ports on link 202. This possibility is addressed by using a second level of ordering.

As described further below, for a unidirectional connection request the second level of ordering assigns transmitters on each of the adjacent nodes starting from the port that is placed in the center (middle) of the first level ordering table. For a subsequent unidirectional connection request, the second level ordering further assigns transmitters from ports adjacent to the middle one (ports that are one up and one down from the middle one according to the first level of ordering table). Similarly, for additional connection requests, transmitters from ports next to them are assigned (ports that are one up and one down from the ones which are adjacent to the middle one according to the first level of ordering) and so on. For the case where there are an even number of ports, transmitters from the two ports in the middle are assigned to the first two unidirectional connection setup requests, and then the above assignment strategy of one up and one down is followed. FIG. 5 shows illustrative second level ordering tables for use in OXC B and OXC E, of FIG. 2, for assigning resources on link 202.

Figure 6:
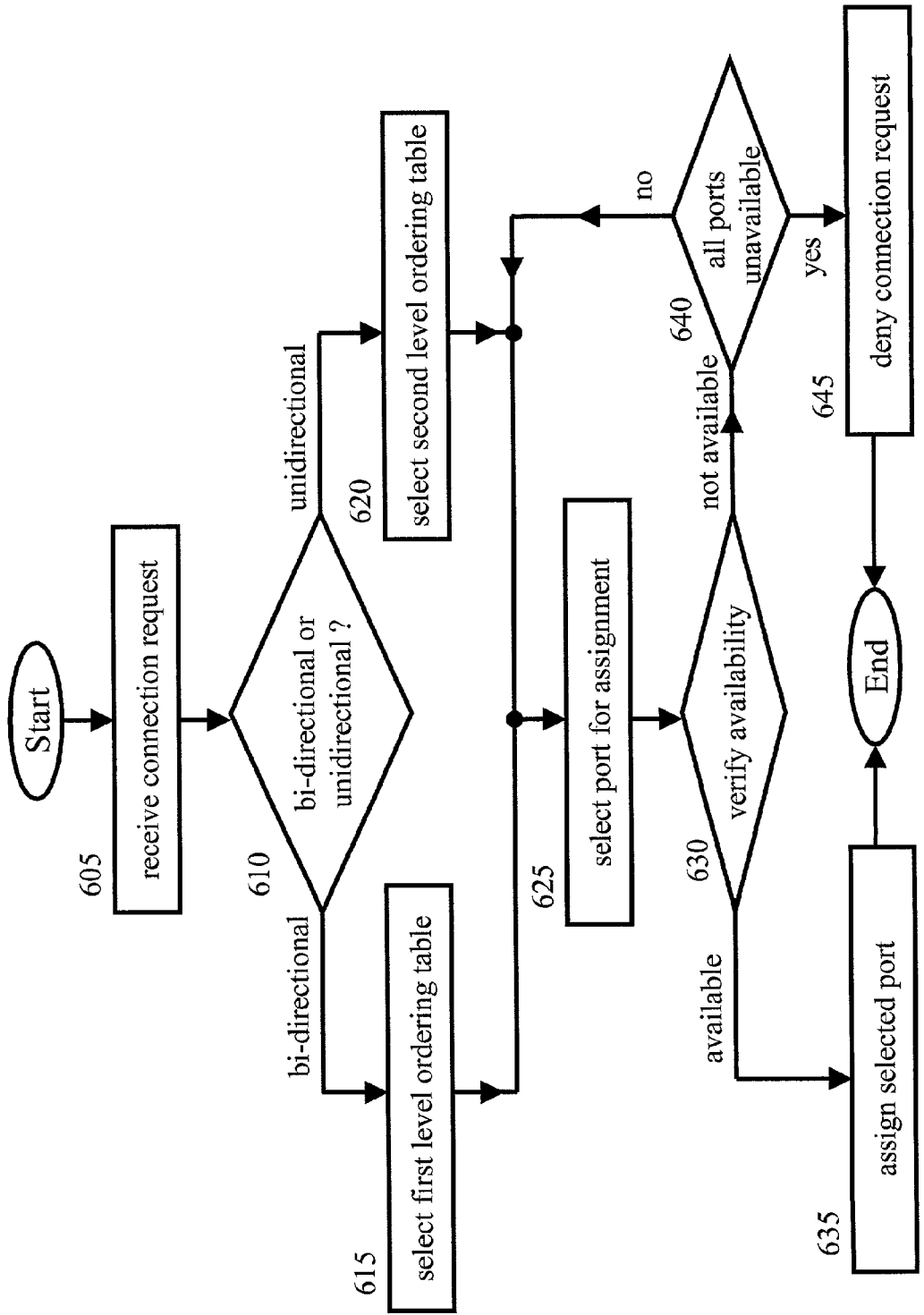
FIG. 6 shows another illustrative flow chart in accordance with the principles of the invention.

Together with the first level of ordering, the second level of ordering allows accommodation of the maximum possible number of connections while avoiding any possible contention until the assignment of last pair of wavelengths. An illustrative method for use in an OXC node in accordance with the principles of the invention, is shown in FIG. 6. In step 605, an OXC node receives a connection request. In step 610, the OXC node first verifies if it is a unidirectional connection request or a bi-directional connection request. Based on the type of the connection request, the OXC node then selects the appropriate ordering table for the link on which it needs to allocate wavelength(s). For a bi-directional connection request the OXC node selects the first level ordering table in step 615; whereas for a unidirectional connection request, the OXC node selects the second level ordering table in step 620. After selecting the appropriate ordering table, the node selects a port for assignment, in step 625, and verifies the availability of the selected port, in step 630. (For example, for a new bi-directional connection request, the first level order table is checked for the selecting the next port. However, it may be the case that the selected port was already assigned, via the second level ordering table, to a prior unidirectional connection request. It should be noted that the above-described selection processes for either a bi-directional connection request or a unidirectional connection request can also be modified to update usage of the resource on both the first level ordering table and the second level ordering table when a resource is first allocated from either table.) If the resource is available, then it is assigned to the connection in step 635. If the resource is not available, a check is made if all ports have been assigned in step 640. If all ports have been assigned, the connection request is denied in step 645. If all ports have not been assigned, another port is selected from the selected table in step 625.

It should be noted that to guarantee optimal wavelength assignment in the dynamic case when a previously assigned unidirectional wavelength becomes free, the second level of ordering, like the first level of ordering, requires that for each unidirectional connection request all the unidirectional wavelengths are searched according to the imposed order of the table. This makes sure that that a recently freed wavelength also gets assigned according to the first level order assignment.

Figure 7:
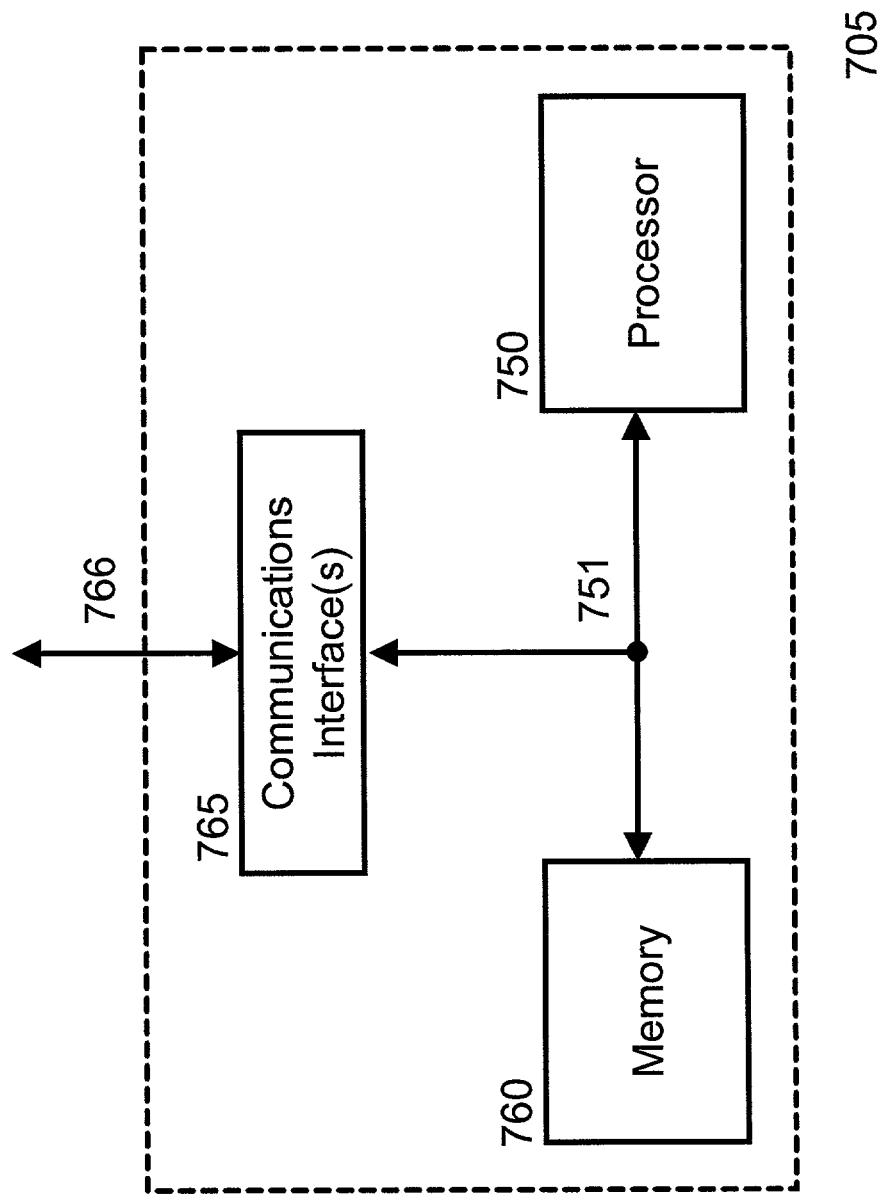
FIG. 7 shows an illustrative high-level block diagram of a node in accordance with the principles of the invention.

Turning briefly to FIG. 7, a high-level block diagram of a representative node 705 for use in accordance with the principles of the invention is shown. Node 705 is a stored-program-control based processor architecture and includes processor 750, memory 760 (for storing program instructions and data, e.g., for storing the above-mentioned first level ordering table and second level ordering table, and for implementing (among other functions not described herein) any of the illustrative flow charts described above and shown in FIGS. 3 and 6) and communications interface(s) 765 for coupling to one or more communication paths as represented by path 766 (e.g., communication(s) interface 765 represents an optical dense wavelength division multiplexer (DWDM)).

As described above, the inventive concept provides a solution for the wavelength assignment problem. This solution is distributed in nature and requires minimal coordination between nodes. Further, the solution reduces, if not eliminates, contention for wavelength resources thus paving the way for fast connection setup and restoration. Finally, the simplicity of the assignment strategy makes implementation of the solution trivial.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although described in the context of an IP controlled OXC-based optical transport network, the inventive concept is applicable to transport networks in general (utilizing an optical fabric and/or an electrical fabric) such as, but not limited to, PDH (Plesiochronous Digital Hierarchy); SONET (Synchronous Optical Transport); SDH (Synchronous Digital Hierarchy), Optical and other future transport network technologies. Also, although illustrated in the context of an out-of-band signaling network, the inventive concept is applicable to an in-band signaling network as well. Similarly, although it was assumed link resources are allocated on a per-port basis, the inventive concept also applies to allocation on a per-wavelength base.

We claim:

1. A method for use in a node of an optical network, the method comprising the steps of:
    receiving a connection request; and
    assigning a link resource selected from link resources that have been released for connecting to a neighboring node by using at least one predefined sequence, that comprises ports and corresponding wavelengths within a node, to avoid contention resulting from the request,
    wherein the at least one predefined sequence resulted from a negotiation with the neighboring node prior to receipt of the request,
    wherein the link resources are selected from the group consisting of ports, wavelengths, SONET-based tributaries, SDH-based tributaries, and PDH-based tributaries.

2. The method of claim 1, wherein the assigning step includes accessing a table for selecting the link resource for assignment to the connection request, the table comprising link resources arranged in accordance with the at least one predefined sequence, wherein the link resources comprise ports of the node associated with the link.

3. The method of claim 2, wherein the network IS an optical transport network.

4. The method of claim 1, wherein the negotiation with the neighboring node prior to receipt of the request results in at least two predefined sequences, a first sequence and a second sequence; and further wherein the assigning step includes determining if the connection request is a bi-directional request or a unidirectional request;
if a bi-directional request, selecting a first table, the first table comprising link resources arranged in accordance with the first sequence;
if a unidirectional request selecting a second table, the second table comprising link resources arranged in accordance with the second sequence; and
selecting the link resource from the selected table for assignment to the connection request and wherein the link resources comprise wavelengths of the node associated with the link.

5. A method for use in a node of an optical network, the method comprising the steps of:
storing a table, wherein the table comprises resources associated with a link with an adjacent node; and
upon receipt of a connection request, selecting a link resource that has been released from the table for use in connecting to the adjacent node, wherein the selection is performed in accordance with a predefined selection sequence that comprises ports and corresponding wavelengths within a node to avoid contention associated with the request, and
wherein the predefined selection was previously negotiated with the adjacent node prior to receipt of the request,
wherein the link resources are selected from the group consisting of ports, wavelengths, SONET-based tributaries, SDH-based tributaries, and PDH-based tributaries.

6. Apparatus for use in an optical network, the apparatus comprising:
a communications interface for use in negotiating a selection sequence, comprising ports and corresponding wavelengths within a node, with an adjacent node prior to receipt of a connection request; and
a processor, responsive to a connection request, for selecting a resource from link resources that have been released in accordance with the selection sequence for connecting to the adjacent node over a link to avoid contention associated with the request,
wherein the link resources are selected from the group consisting of ports, wavelengths, SONET-based tributaries, SDH-based tributaries, and PDH-based tributaries.

7. The apparatus of claim 6, wherein the processor accesses a table for selecting the resource for assignment to the connection request, the table comprising the resources associated with the link arranged in accordance with the selection sequence, and
wherein the resources associated with the link comprise ports associated with the link.

8. The apparatus of claim 7, wherein the network is an optical transport network.

9. A node of an optical network, comprising:
a memory means for storing a table, wherein the table comprises resources associated with a link with an adjacent node; and
a processing means for use in processing a connection request such that upon receipt of the connection request, the processing means selects a link resource from the table that has been released for use in connecting to the adjacent node, wherein the selection is performed in accordance with a predefined selection sequence comprising ports and corresponding wavelengths with a node to avoid contention associated with the request, and wherein the predefined selection sequence was previously negotiated with the adjacent node prior to receipt of the request,
wherein the link resources are selected from the group consisting of ports, wavelengths, SONET-based tributaries, SDH-based tributaries, and PDH-based tributaries.

10. The node of claim 9, wherein the node is an optical transport network.

* * * * *